D. H. HAYDEN.
REINFORCEMENT FOR THE COMPOSITION COVERING OF STRUCTURAL SHAPES.
APPLICATION FILED MAR. 14, 1912.
1,300,835. Patented Apr. 15, 1919.
3 SHEETS—SHEET 2.
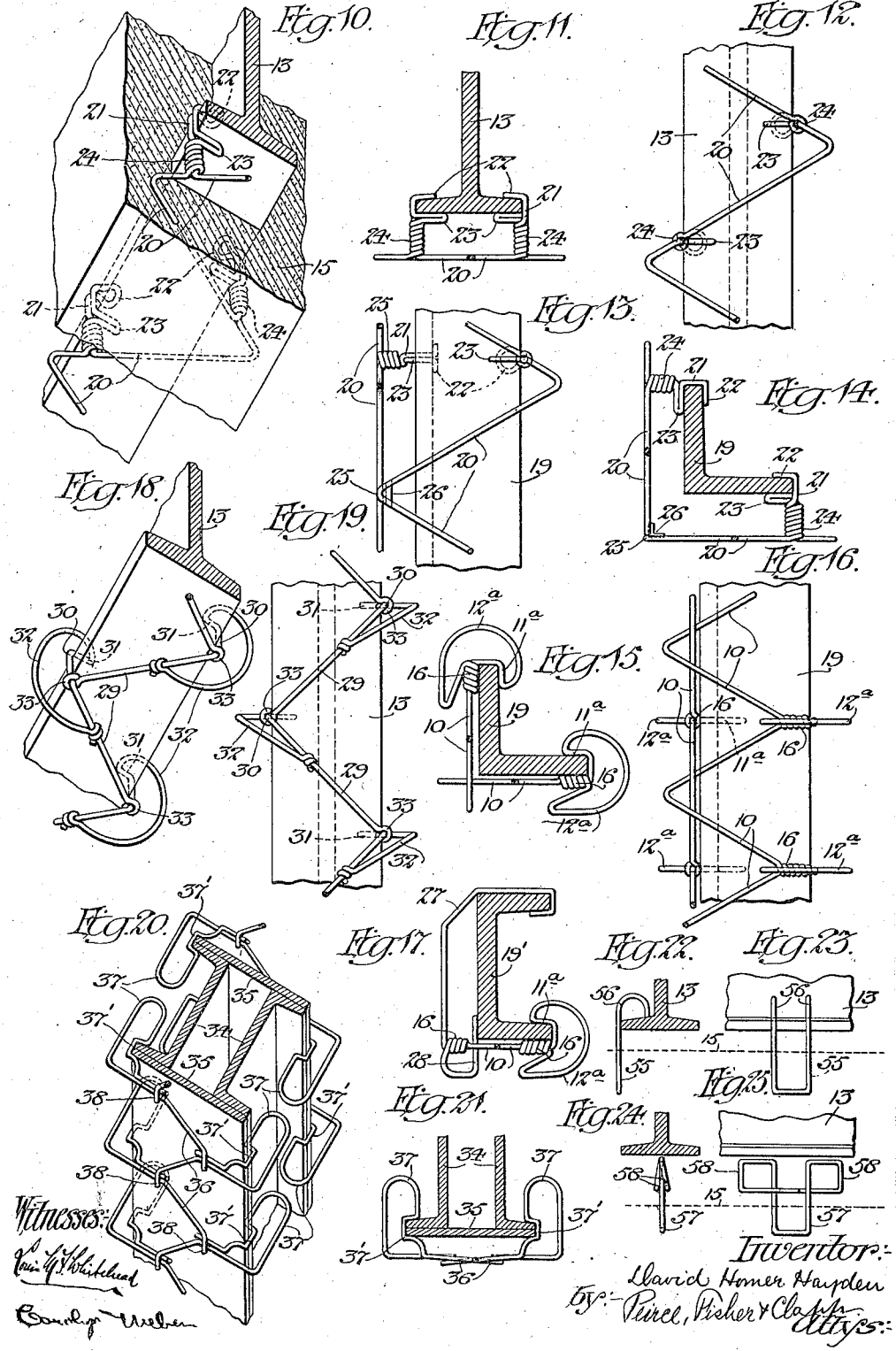

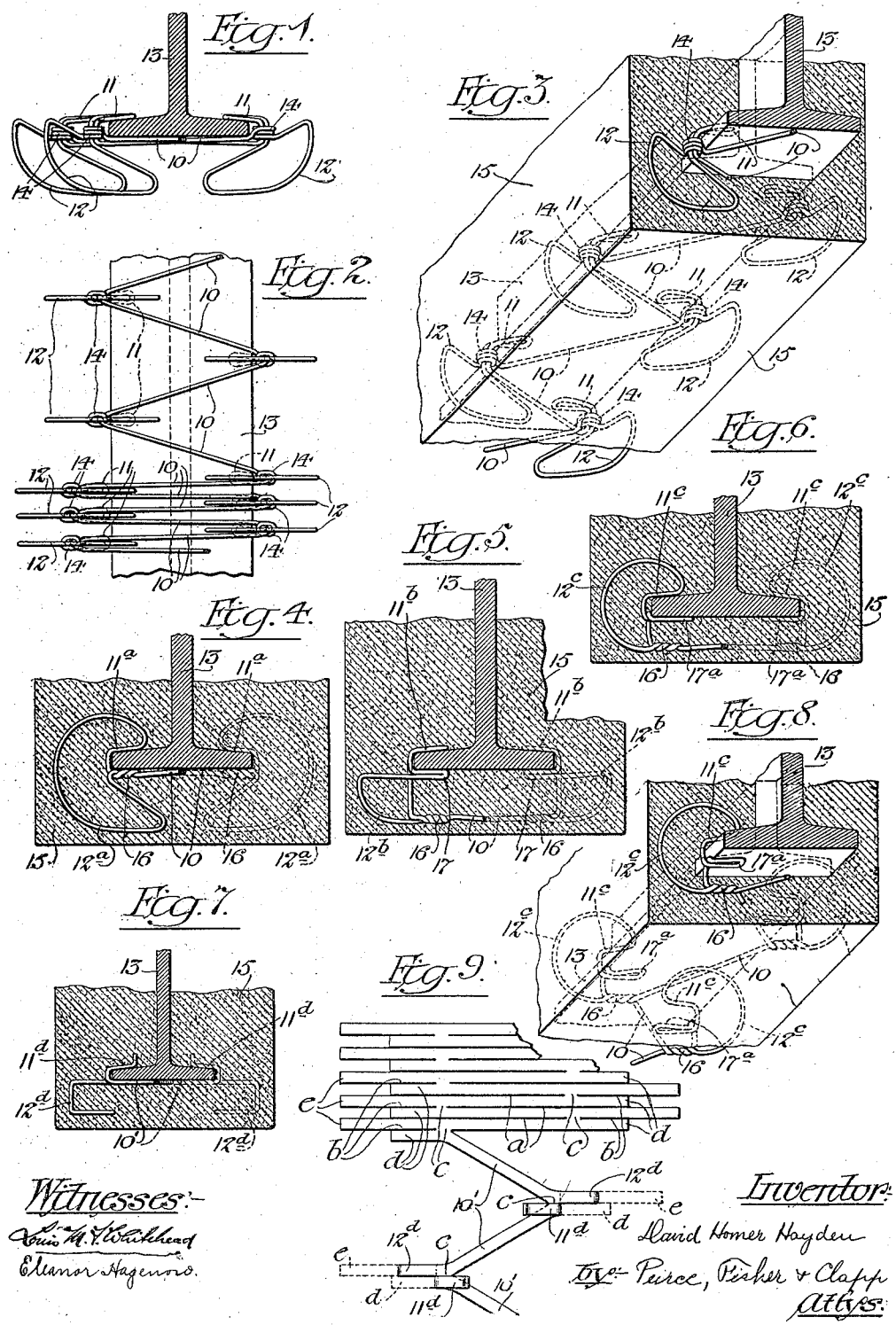

D. H. HAYDEN.
REINFORCEMENT FOR THE COMPOSITION COVERING OF STRUCTURAL SHAPES.
APPLICATION FILED MAR. 14, 1912.
1,300,835.
Patented Apr. 15, 1919.
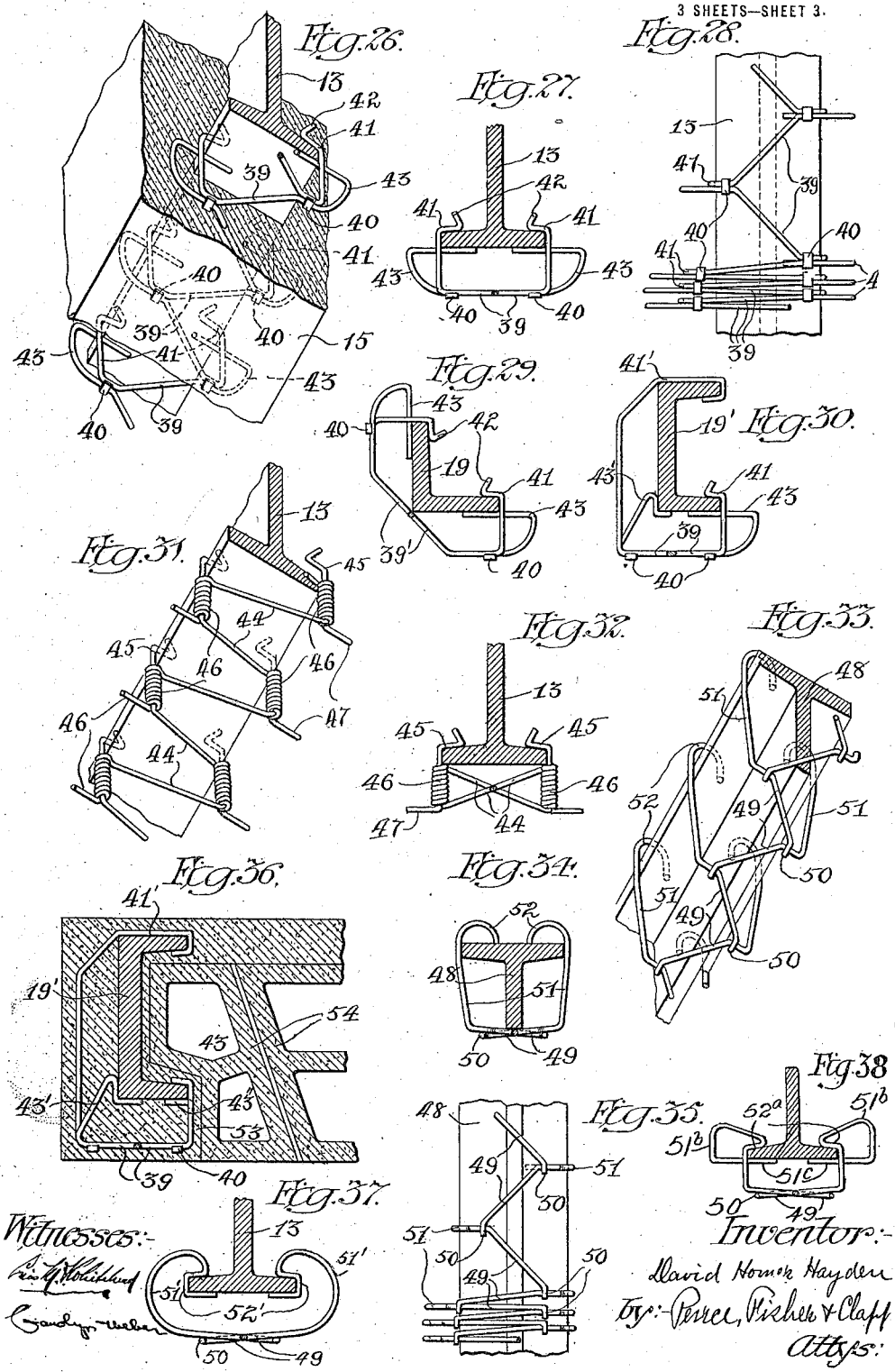

UNITED STATES PATENT OFFICE.

DAVID HOMER HAYDEN, OF NEW YORK, N. Y.

REINFORCEMENT FOR THE COMPOSITION COVERING OF STRUCTURAL SHAPES.

1,300,835. Specification of Letters Patent. Patented Apr. 15, 1919.

Application filed March 14, 1912. Serial No. 683,819.

*To all whom it may concern:*

Be it known that I, DAVID HOMER HAYDEN, a citizen of the United States, and a resident of New York, county and State of New York, have invented certain new and useful Improvements in Reinforcements for the Composition Covering of Structural Shapes, of which the following is a full, clear, and exact description.

The improvement relates to reinforcements for the concrete and like composition covering of structural members and seeks to provide a simple, inexpensive reinforcement which can be transported in collapsed form and readily applied to structural members with the reinforcing elements thereof in predetermined position relatively to the members. The invention consists in the features of improvement hereinafter set forth, illustrated in different forms in the accompanying drawings and more particularly pointed out in the appended claims.

In the drawings, Figure 1 is a section of the lower part of an I-beam with one form of the improved reinforcement applied thereto. Fig. 2 is an inverted plan view of the parts shown in Fig. 1. In Figs. 1 and 2 part of the reinforcement is expanded and part is unexpanded to illustrate the manner of applying the same to the beam. Fig. 3 is a perspective view of the lower part of the I-beam and the reinforcement embedded in the concrete covering. Figs. 4, 5 and 6 are sectional views illustrating different forms of the reinforcement. Fig. 7 is a perspective view illustrating another form. Fig. 8 is a perspective view of the parts illustrated in Fig. 6. Fig. 9 is a plan view illustrating the manner of making the form of reinforcement shown in Fig. 7. Fig. 10 is a perspective view illustrating another form of the improved reinforcement. Figs. 11 and 12 are sectional and inverted plan views, respectively, of the form shown in Fig. 10. Figs. 13 and 14 are sectional and inverted plan views of a form similar to that shown in Fig. 10, but adapted for use upon an angle bar. Figs. 15 and 16 are sectional and inverted plan views, respectively, of a form similar to that shown in Fig. 4, but modified to adapt the construction to an angle iron. Fig. 17 is a cross-section showing a further modification of the same form to adapt the same to a channel iron. Figs. 18 and 19 are perspective and inverted plan views of another form of the improved reinforcement. Figs. 20 and 21 are perspective and cross-sections, respectively, illustrating the application of one form of the reinforcement to a column. Figs. 22 and 23 are a section and a side view, respectively, illustrating a hanger. Figs. 24 and 25 are similar views illustrating another form of hanger. Figs. 26, 27 and 28 are perspective, sectional and inverted plan views, respectively, of another modification. Figs. 29 and 30 are sections illustrating the application of the form shown in Fig. 26 to an angle iron and to a channel iron, respectively. Figs. 31 and 32 are perspective and sectional views, respectively, of another form of the improved reinforcement. Figs. 33, 34 and 35 are perspective, sectional and inverted plan views, respectively, of a form of the reinforcement adapted for T-irons. Fig. 36 is a sectional view illustrating a channel bar covered with reinforced concrete and adapted to support hollow tile forming a floor. Fig. 37 and Fig. 38 are cross sections illustrating further modifications.

The improved reinforcement comprises a series of connected cross stays or members which are capable of expansion longitudinally of the member and of contraction laterally thereof, the reinforcement being provided with attaching elements which hook over the flanges or edges of the structural member when the reinforcement is expanded. The parts are so arranged that the complete engagement of the attaching elements with the member limit the expansion and the portions of the reinforcement which are embedded in the concrete or like composition covering are held in proper offset relation from the structural member.

In the form shown in Figs. 1, 2 and 3, each of the cross stays or members 10 is connected at its ends to the adjacent cross stays of the series and at the points of connection between the stays, the reinforcement is provided with extended, offset attaching hooks 11 and reinforcing elements 12. The hooks 11 are offset above the plane of the cross stays and are inturned to engage the flanges of the I-beam 13. The greater part of each reinforcing element 12 is offset below the plane of the cross stays and portions of these reinforcing elements project outwardly from the base flange of the I-beam, while other portions extend downwardly and inwardly below the same.

This form of the invention is preferably constructed of a length of annealed wire which is bent back and forth upon itself to form the series of cross stays 10. A portion of the length of wire between each pair of cross stays is bent to form the loop shaped or double hook 11 and the triangular reinforcing element or loop 12, the wire being then twisted or turned one or more times about the bend of the hook, as indicated at 14, and the turns or coils 14 serve to directly connect the cross stays 10. The attaching and reinforcing elements 11 and 12 are thus formed of integral portions of the cross stays which extend beyond the points of connection thereof. By reason of this arrangement, the expansion of the cross stays will not distort the attaching and reinforcing elements.

The reinforcement is proportioned to properly fit upon a structural member of definite shape and size. Before it is applied thereto, the series of cross stays 10 are substantially parallel to one another, as shown at the lower portion of Fig. 2. In this unexpanded condition, the space between the attaching hooks 11 at opposite sides of the reinforcement is such that they may be readily slipped over the flanges of the structural member to which the reinforcement is to be applied. The reinforcement is then expanded and the hooks are drawn together snugly into engagement with the flanges of the I-beam or other member and the cross stays are separated and then extend back and forth in zig-zag fashion between the attaching hooks 11 and over the face of the member. In the form shown in Figs. 1, 2 and 3 the cross stays are arranged to lie against the lower face of the I-beam 13 and the complete engagement of the hooks 11 and the cross stays 10 with the edges and outer face of the member will limit the amount of expansion to thereby properly hold the reinforcing elements 12 in offset position, and so that the number of reinforcing elements per lineal foot can be predetermined. The reinforcing elements or loops 12 are arranged in planes substantially at right angles to the plane of the series cross stays and to the face of the member with which the cross stays engage. The reinforcing loops 12 project laterally beyond the edges of the base of the I-beam and downwardly and inwardly below the same so as to properly reinforce the concrete covering 15 within which they are embedded.

In the form shown in Fig. 4, the adjacent cross stays 10 are connected by twisting adjacent portions of the length of wire together, as indicated at 16, and a portion of the wire beyond each twist is formed into a single loop arranged in a plane substantially at right angles to the plane of the series of cross stays and having portions offset both above and below the cross stays. The inner portion of the loop above the stays is shaped to form an attaching hook 11$^a$ for engaging the flange of the structural member, while the remainder of the loop is shaped to form a curved reinforcing element 12$^a$ which extends about the edge of the structural member and inwardly below the same to properly reinforce the concrete covering 15 within which it is embedded.

The reinforcements shown in Figs. 5 and 6 are also formed of lengths of wire in which the stays are connected by twists 16, and in these forms looped portions beyond the twists are offset above the plane of the cross stays. In the form shown in Fig. 5, a portion of each loop is doubled upon itself and shaped to form a jaw, which is adapted to embrace the edge of the flange of the I-beam, while the remainder of the loop comprises a laterally and outwardly projecting reinforcing element 12$^b$. The attaching jaw comprises an inturned hook 11$^b$ arranged to engage the inner face of the flange of the I-beam and an inwardly projecting lug or spacing element 17 arranged to engage the outer face of the I-beam. In this form, the expansion is limited by the complete engagement of the attaching and spacing elements 11$^b$ and 17 with the base flange of the I-beam and the cross stays 10 are held offset from the outer face of the beam to reinforce the concrete covering 15.

The form shown in Fig. 6 is quite similar to that shown in Fig. 5. In this form, each extension loop is provided with a double, inwardly projecting, spacing lug 17$^a$ and with an inwardly extending hook portion 11$^c$. The reinforcing portion 12$^c$ of the loop is curved and extends from the inner end of the hook 11$^c$ about and offset from the edge of the I-beam back to the twisted portion or connection 16. Fig. 8 is a perspective view of the form shown in Fig. 6.

The form shown in Figs. 7 and 9 is constructed from a piece of expanded metal having alternate long and short slits $a$ and $b$ extending inwardly on opposite sides thereof to thereby form the expansible series of cross stays 10′ which are connected at the points $c$ and provided with extensions $d$ and $e$. The extensions $d$ are preferably shorter than the extensions $e$ and are upwardly and inwardly offset, as shown in Fig. 7, to form attaching hooks 11$^d$. The extensions $e$ extend laterally from the points $c$ and are then bent downwardly and inwardly to form reinforcing elements 12$^d$.

The form shown in Figs. 10, 11 and 12 is formed of a continuous length of wire, but in this form the cross stays or members 20 project laterally beyond the extensions which form the attaching hooks and spacers. In constructing this form, each of the cross stays is doubled upon itself at a point adjacent but spaced apart from one end of the stay and bent to form a laterally projecting extension 21 having jaw portions, an attaching hook 22 and a spacing lug 23. The two members of the part 21 are secured or twisted together adjacent the cross stay 20, as indicated at 24.

The form shown in Figs. 13 and 14 comprises two series of cross stays similar to that shown in Figs. 10, 11 and 12, except that the attaching hooks and spacers on one side of each series are omitted and the corners or angles between the cross stays at one series are connected on one side to the corresponding corners or angles of the other series of cross stays. This connection is preferably formed by welding the two series of cross stays together at the points 25. If desired, the connections may be strengthened by small reinforcing clips 26 welded in position.

The form shown in Figs. 15 and 16 is adapted for use upon an angle bar and comprises two series of cross stays which are similar to that shown in Fig. 4, except that the loop extensions on one side of each series are omitted and the two series interlocked or woven together, as shown. The form shown in Fig. 17 is also similar to that shown in Fig. 4, but is modified so that it may be applied to a channel bar. In this form the loops on one side of the reinforcement are divided and one part of each divided loop is extended upwardly to form an attaching hook 27 which is adapted to extend over and engage the edge of the upper flange of the channel beam. The other part of the loop is bent downwardly and then upwardly to form a spacing element 28 which engages the lower part of the vertical side face of the channel.

In the form shown in Figs. 18 and 19, the cross stays 29 are pivotally connected at their ends. Each stay is formed of a separate piece of wire and at one end is bent to form a vertical part 30, a hook 31 and a looped reinforcing part 32, the end of which is hooked over the cross stay at a point intermediate its ends. The opposite end of the cross stay is provided with an eye 33 through which the vertical portion 30 of the next adjacent stay extends. The parts 30 and 33 thus form a series of pivotal connections between the cross stays or links. In other respects the construction is similar to that shown in Fig. 4. In the other forms shown, the expansion of the reinforcement necessarily bends the metal portions of the cross stays at their points of connection, whereas in the form shown in Figs. 18 and 19, there is no such bending; hence, the galvanizing coat, which is some times applied to concrete reinforcements to prevent corrosion, will not be injured. The form shown in Figs. 20 and 21 is applied to a column or girder built up of channel irons 34 and plates 35. In this form, the reinforcement is made of separate pieces of wire, each forming one of the cross stays 36. The end of each wire is bent laterally and upwardly to form a reinforcing loop 37. The parallel adjacent ends of the loop are welded or otherwise suitably secured to the end portion 38 of the next adjacent cross stay. The inner side of each loop is bent to form a U-shaped hook 38 which extends about the flanges of the column or girder and acts both as an attaching hook and a spacer for securing the reinforcement in place and holding the reinforcing parts in proper offset relation.

The form shown in Figs. 26 to 30, inclusive, is made of separate pieces of wire or end cross stays 39. The ends of the adjacent cross stays are secured together preferably by welding small clips 40 thereto. The ends of the wires which form the stays extend beyond the points of connection, one extension of each wire being bent laterally and then inwardly to form an attaching hook 41 which hooks over the flange of the I-beam or other structural shape and terminates in an outturned lug 42. The other extension of each cross stay is bent outwardly and upwardly and thence inwardly to engage the face of the structural member and thus form a spacing member 43. The extension or member 43 also projects well beyond the edge of the beam and aids in reinforcing the concrete.

The form shown in Fig. 29 is similar to that shown in Figs. 26, 27 and 28, except that the cross stays 39' are bent so that the construction may be applied to an angle bar 19. The form shown in Fig. 30 is also similar, except that the attaching hooks 41' and spacers 43' on one side are suitably shaped to engage the upper flange and lower inner edge portions, respectively, of a channel iron 19'.

In the form shown in Figs. 31 and 32 the stays 44 are each formed of a separate piece of wire and the alternate stays of the series are oppositely inclined. The lower or outer end of each stay is provided with an upwardly and inwardly bent extension forming an attaching hook 45. The opposite end of each stay is twisted around the attaching element or hook 45 of the next adjacent stay, as indicated at 46, and terminates in an outwardly projecting extension 47. If desired, the vertical portions of the attaching elements 45 of one stay and the twisted portion 46 of the next adjacent stay may form pivotal connections between the stays. As stated, in this form, the adjacent stays of the series are oppositely inclined with respect to the face of the structural member. The upper or inner end of each stay engages the outer face of the member and acts as a spacer to hold the reinforcing portions, which are embedded in the concrete, in proper offset relation.

The form shown in Figs. 33, 34 and 35 is especially adapted for use with a T-iron 48. Each cross stay 49 is formed of a separate piece of wire and is welded or otherwise suitably secured to the end portion 50 of the next adjacent stay. Each cross stay is provided with an integral portion extending beyond the point of connection 50 and its extension 51 is bent laterally from the series of stays and its upper end shaped into a semi-circular hook 52 which is adapted to extend over the side edges of the base flange of the T-iron. A series of cross stays themselves engage the lower edge of the leg of the T-iron, as shown. It should be noted that this form is quite similar to the form shown in Figs. 26, 27 and 28, except that the spacers are omitted, since not required. The form shown in Fig. 27 is similar to the form shown in Fig. 33, except that the extensions 51' are curved upwardly and outwardly and the ends are formed into U-shaped hooks 52' which embrace the edges of the lower flange of an I-beam.

The form shown in Fig. 36 is similar to that shown in Fig. 30. The concrete covering 53 which is securely reinforced, is shaped to support the tile block 54 of a floor construction.

Where the concrete covering is securely held upon the soffit of a structural member by the improved reinforcement, hangers for hanging pipes and the like may be readily suspended therefrom. One form of such a hanger is shown in Figs. 22 and 23, and comprises a U-shaped member 55, the ends of which are bent into hooks 56 and arranged to engage the flange of the I-beam. The hanger extends downwardly through the concrete covering and the reinforcement thereof prevents the rupture of the covering, so that the hanger 55 is rigidly secured in position.

The hanger shown in Figs. 24 and 25 comprises a U-shaped hanger 57, the ends of which terminate in eyes 58. This hanger is adapted to be supported, not upon the I-beam, but upon the offset portions of the reinforcement. In all of the forms of the improved reinforcement, the construction is such that the expansion is limited or arrested by the complete engagement of the attaching hooks or elements with the flanges of the structural members and the parts are so arranged that the force applied to effect the expansion cannot distort the reinforcing elements or hooks or disengage the latter from the structural members. In all forms, means are provided for holding the reinforcing portions, which are embedded in the concrete, in proper offset relation. By proportioning the parts of any of the forms, the desired amount of reinforcement per lineal foot can be properly predetermined.

It is obvious that the improved reinforcement may be adapted for different structural shapes and that numerous changes may be made in the details set forth without departure from the essentials of the invention as defined in the claims.

I claim as my invention:—

1. A reinforcement for the composition covering of structural members comprising a series of cross stays adapted to extend back and forth over the face of the member and having attaching elements offset on one side of the plane of said cross stays and reinforcing elements offset upon the other side of the plane thereof, said cross stays being securely connected together at points removed from the outer ends of said attaching and reinforcing elements to thereby hold said stays against displacement and in predetermined spaced relation on the member.

2. A reinforcement for the composition covering of structural members comprising an expansible series of connected cross stays having offset attaching hooks, said attaching hooks and said cross stays being arranged to engage the edges and abut against the under face respectively of the structural member upon the expansion of the reinforcement to secure the latter thereto with said cross stays in proper spaced relation, and said series of cross stays having reinforcing portions offset below the plane thereof.

3. A reinforcement for the composition covering of structural members comprising an expansible metal strip having attaching elements offset on one side of the plane of the strip and arranged to engage the edges of the structural member upon expansion of the strip to secure the latter thereto, and said strip having reinforcing elements offset upon the opposite side of the plane thereof and arranged to extend within the composition covering, the expansible portions of said metal strip being securely connected together against separation at points removed from the outer ends of said attaching and reinforcing elements, whereby the latter is not expanded or materially distorted by the expansion of the reinforcement.

4. A reinforcement for the composition covering of structural members comprising an expansible series of connected cross-stays having integral portions extending beyond the points of connections thereof, said extending portions being offset above and below the plane of said cross-stays and bent to form attaching hooks and reinforcing elements.

5. A reinforcement for the composition covering of structural members comprising an expansible series of connected cross-stays, each connected to the adjacent cross-stays of the series and having integral portions extending beyond the points of connection thereof, said extending portions being offset from the plane of the cross-stays and bent to form attaching hooks and reinforcing elements, said hooks and said cross-stays being arranged to engage the edges and outer face respectively of the structural members to limit the expansion and hold said reinforcing elements in proper position.

6. A reinforcement for the composition covering of structural members comprising a series of cross stays connected at intervals against separation to define an angular or zigzag arrangement of the cross stays over the face of the member, each of said cross stays having an integral extension projecting beyond the point of connection with the next adjacent stay, and each of said extensions comprising a U-shaped jaw portion arranged to fit upon the flange of the structural member, and a portion projecting outwardly from said jaw and arranged to extend within and reinforce the composition covering about the flange of the structural member.

7. The combination with a structural member, of an expansible series of connected cross-stays extending back and forth over and in contact with the face of the member, upwardly offset attaching hooks extending from the points of connection of said cross-stays and engaging the edges of the member, laterally and downwardly offset reinforcing elements extending from said cross-stays, and a composition covering wherein said reinforcing elements are embedded.

8. A reinforcement for the composition covering of structural members comprising a length of wire bent back and forth to form a series of connected cross-stays with loop portions extending from and beyond the points of connection of said cross-stays, said loop portions being bent to form attaching and reinforcing elements.

9. A reinforcement for the composition covering of structural members comprising a length of wire bent back and forth and having adjacent portions connected at intervals to form an expansible series of connected cross-stays with loop portions extending from the points of connection between the cross-stays, and said loop portions being offset from the plane of the cross-stays and bent to form attaching hooks and reinforcing elements.

10. A reinforcement for the composition covering of structural members comprising a length of wire bent back and forth and having adjacent portions twisted together to form an expansible series of cross-stays with loops extending from said twisted portions, said loops being offset from the plane of said cross-stays and having parts bent to form attaching hooks and spacing elements.

11. A reinforcement for the composition covering of structural members comprising a series of cross stays adapted to extend back and forth over the face of the member, each cross stay being connected to the adjacent cross stays of the series to thereby hold said cross stays in position and in proper spaced relation, each of said cross stays having an integral extension at one end projecting beyond the point of connection with the next adjacent stay, each of said extensions comprising a U-shaped jaw portion arranged to fit upon the edge of the structural member and a portion extending from said jaw and arranged to extend within and reinforce the composition covering about the edge of the structural member.

12. A reinforcement for the composition covering of structural members comprising an expansible series of cross-stays, each of said cross-stays having a hook and reinforcing loop at one end arranged in a plane transverse to the plane of the cross-stays, the opposite end of each stay having an eye pivotally engaging the hook portion of the next adjacent stay.

13. A reinforcement for the composition covering of structural members comprising an expansible series of connected cross-stays, certain of said stays having offset loop portions bent to form attaching and spacing elements, the members of each of said loop portions being connected at a point adjacent its stay.

14. A reinforcement for the composition covering of structural members comprising a link of wire bent back and forth to form a series of connected cross-stays with offset loop portions extending from said cross-stays, said loop portions being bent to form attaching and spacing elements and the members of said loop portions being connected at points adjacent the cross-stays.

15. A reinforcement for the composition covering of structural members comprising an expansible series of connected cross-stays, each of said cross-stays having a closed loop at or adjacent one end, and each of said loops having a U-shaped jaw portion arranged to extend about the edges of the flanges of the structural member, said U-shaped jaw portions being tied at points adjacent their loops.

DAVID HOMER HAYDEN.

Witnesses:
SAM A. PHILLIPS,
ALEXANDER B. TAPPEN.

Copies of this patent may be obtained for five cents each, by addressing the "Commissioner of Patents, Washington, D. C."